UNITED STATES PATENT OFFICE.

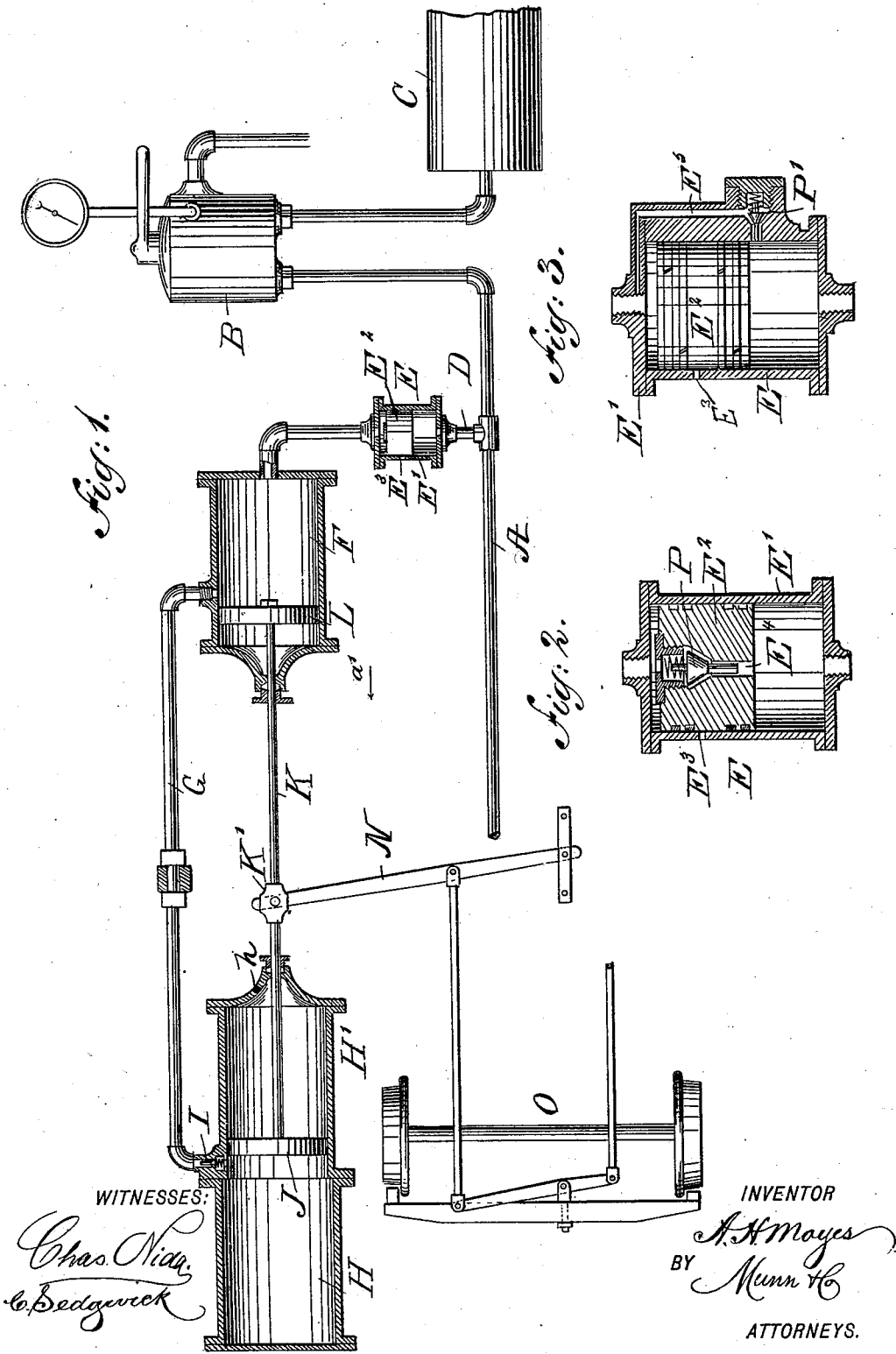

ALEXANDER H. MOYES, OF OGDEN, UTAH TERRITORY.

FLUID-PRESSURE BRAKE.

SPECIFICATION forming part of Letters Patent No. 507,447, dated October 24, 1893.

Application filed December 5, 1892. Serial No. 454,061. (No model.)

*To all whom it may concern:*

Be it known that I, ALEXANDER H. MOYES, of Ogden, in the county of Weber and Territory of Utah, have invented certain new and useful Improvements in Fluid-Pressure Brakes, of which the following is a full, clear, and exact description.

The invention relates to air brakes of the Westinghouse type, and its object is to provide certain new and useful improvements in fluid pressure brakes, whereby a quick and positive action for applying and releasing the brakes is obtained.

The invention consists of certain parts and details, and combinations of the same, as will be hereinafter described and then pointed out in the claim.

Reference is to be had to the accompanying drawings, forming a part of this specification, in which similar letters of reference indicate corresponding parts in all the figures.

Figure 1 is a sectional plan view of the improvement. Fig. 2 is an enlarged sectional side elevation of the double action valve; and Fig. 3 is a similar view of a modified form of the valve.

The train pipe A is connected in the usual manner with the engineer's valve B, and the main reservoir C, and from the said train pipe extends a branch pipe D containing a double acting valve E and connected with an auxiliary air cylinder F, arranged under each car. This cylinder F is connected by a pipe G with the auxiliary air reservoir H, provided with a cylindrical extension H' arranged in line with the auxiliary air cylinder F, as plainly shown in Fig. 1.

A check valve I is arranged in the entrance opening of the pipe G into the auxiliary reservoir H, so that the said pipe G is closed when air is released from the cylinder F, as the preponderance of pressure is then in the auxiliary reservoir. In the cylindrical extension H' of the auxiliary reservoir H is fitted to slide a piston J connected by a piston rod K with a piston L fitted to slide in the auxiliary air cylinder F, and the head of the cylinder H' is provided with an opening $h$ communicating with the outside. The piston K is provided with a suitable cross head K' between the two cylinders F and H', this head being connected with the brake lever N of the usual brake mechanism O.

The double action valve E illustrated in detail in Fig. 2, is provided with a cylindrical casing E' containing a piston $E^2$ adapted to close or open an air outlet aperture $E^3$ in the wall of the casing E'. When the piston $E^2$ is in a lowermost position, then the outlet opening $E^3$ is uncovered, and air can pass from the upper end of the casing E', outside. When the piston $E^2$, however, is in an uppermost position, as shown in Figs. 1 and 2, the said aperture $E^3$ is closed and escape of air is prevented.

In the piston $E^2$ is arranged an opening or port $E^4$ formed with a valve seat on which is adapted to be seated a spring pressed valve P, opened by pressure from the train pipe after the piston $E^2$ has moved into an uppermost position, as shown in Fig. 2, the air then passing from the train pipe through the branch pipe D into the casing E', through the same and the opening $E^4$ in piston $E^2$ to the upper end of the branch pipe D, to finally pass into the auxiliary cylinder F. The valve P seats itself as soon as the pressure or inflow of the air ceases.

As illustrated in Fig. 3, the valve and its opening are not arranged in the piston, but in the casing. For this purpose, the latter is provided with a channel $E^5$ leading from the lower end of the casing into the upper end of the same, the valve P' being arranged in the lower end of the said channel, as shown. It will be seen that in this case, the piston $E^2$ is forced upward by pressure from the train pipe A, until the lower end of the piston uncovers the lower end of the channel $E^5$, so that the air pressure can open the valve P' and pass through the channel $E^5$ to the upper end of the casing E' and finally into the auxiliary air cylinder F.

The operation is as follows: The air from the train pipe A passes through the double action valve E in the manner above described, by forcing the piston $E^2$ upward, and opening the valve P or P' to permit the air to pass to the cylinder F. The air pressure in the latter causes the piston L to travel outward in the direction of the arrow $a'$, whereby the other piston J is moved in the same direction and the brake mechanism O is actuated to release the brakes, as will be readily understood by reference to Fig. 1. As soon as the piston L has passed the end of the pipe G, leading from the cylinder F, then the air from the latter passes through the pipe G and past the check valve I into the auxiliary reservoir H, to charge the latter. As the pressure on the outer faces of the pistons J and L is equal, the said pistons will remain in the position shown with the brakes released. Now, when it is desired to apply the brakes, the engineer actuates, in the usual manner, his valve B, to let out air from the train pipe so that the preponderance of pressure from the cylinder F in the upper end of the branch pipe D, causes the piston $E^2$ to slide downward to uncover the outlet opening $E^3$, so that air is discharged from the upper end of the casing E', and the cylinder F. As soon as a reduction of pressure in the cylinder F, takes place, the valve I closes by the preponderance of pressure in the auxiliary reservoir H, the said pressure then forcing the piston J in the inverse direction of the arrow $a'$, thereby actuating the lever N to apply the brakes. When the engineer desires to release the brakes, he charges the train pipe A in the usual manner, so that the air pressure in the branch pipe D causes the piston $E^2$ of the double action valve E to move upward in the casing E', to close the outlet opening $E^3$ and permit air to pass to the air cylinder F, which charges the latter and returns the piston L to release the brakes, as previously described, at the same time charging the auxiliary reservoir H in the manner above described.

It will be seen that by this arrangement, the auxiliary reservoir H is always charged with air pressure to actuate the brake mechanism, to apply the brakes quickly, as soon as air is released from the train pipe.

Having thus fully described my invention, I claim as new and desire to secure by Letters Patent—

A fluid pressure brake comprising the auxiliary air cylinder F, the auxiliary air reservoir H, a brake rod extending through the adjacent ends of said cylinder and reservoir, and having pistons L J on its ends, a pipe or passage G leading from between the ends of the cylinder F to the auxiliary reservoir beyond the normal position of its piston and there provided with an outward closing check valve, the train pipe, a pipe connecting the train pipe with the outer end of the cylinder F; the said piston L normally permitting the passage of air from train pipe through cylinder F, and pipe or passage G to the said auxiliary reservoir, and a double acting valve in the pipe leading from the train pipe to cylinder F and normally permitting (through a check valve) the passage of air to said cylinder F while closing an exhaust to the open air; whereby the escape of air from the train pipe will cause the compressed air to exhaust from cylinder F through the said double acting valve and also cause the forward throw of said two pistons; the piston L passing the end of pipe or passage G where it will be acted upon by the incoming air through the double acting valve from the train pipe to release the brakes and again uncover the pipe or passage G for the re-charging of the said auxiliary reservoir therethrough, substantially as set forth.

ALEXANDER H. MOYES.

Witnesses:
THEO. G. HOSTER,
C. SEDGWICK.